United States Patent [19]

Brodin

[11] Patent Number: 5,018,254
[45] Date of Patent: May 28, 1991

[54] TUG RELEASE CONNECTOR

[76] Inventor: Christer Brodin, 104 N. Davis, Belgrade, Mont. 59714

[21] Appl. No.: 562,324
[22] Filed: Aug. 3, 1990
[51] Int. Cl.$^5$ ............................................. A44B 13/00
[52] U.S. Cl. .................. 24/601.5; 24/599.2; 24/599.4
[58] Field of Search .................. 24/601.5, 600.3, 602, 24/298, 599.1, 599.2, 599.4, 599.5, 599.7, 599.8

[56] References Cited

U.S. PATENT DOCUMENTS

| 48,275 | 6/1865 | Hamilton | 24/601.5 |
|---|---|---|---|
| 343,037 | 6/1886 | Klinkner | 24/601.5 |
| 359,929 | 3/1887 | Kinsley et al. | 24/599.9 |
| 1,511,917 | 10/1924 | Smith et al. | 24/600.3 |
| 2,276,628 | 3/1942 | Quilter | 24/601.5 |

Primary Examiner—Victor N. Sakran
Attorney, Agent, or Firm—Richard C. Conover

[57] ABSTRACT

A tug release connector which is opened by tugging on an object being held by a clip. The tug release connector having a hollow body member with a bore therethrough. At one end there is provided a lip surrounding the bore. The lip acts as a catch. An elongate shaft is received by the bore and is spring loaded to partially retract into the hollow body member. The shaft extends from the hollow body member outwardly beyond the lip.

To hold an object, one end of a curved lip is hingedly mounted to the shaft outside the body member. The clip hingedly rotates between a closed position, where a free end of the clip is held by the lip of the body member, and an open position, where the free end is unconstrained from rotating away from the lip. When an object held by the clip is tugged, the shaft extends releasing the free end of the clip from the lip.

4 Claims, 1 Drawing Sheet

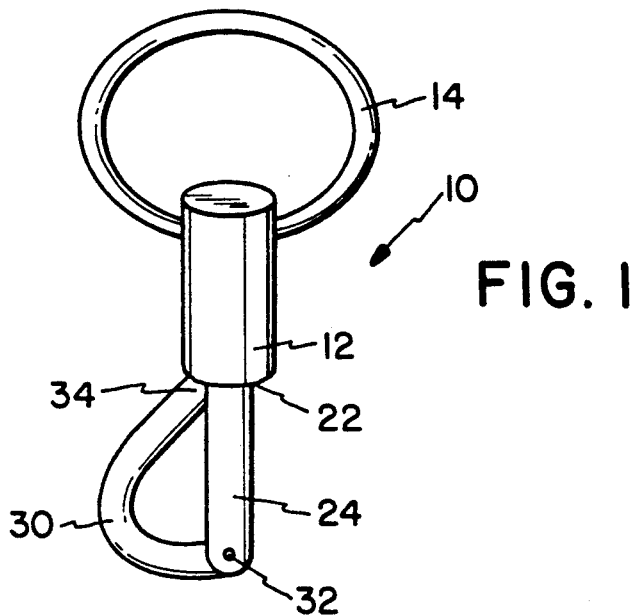
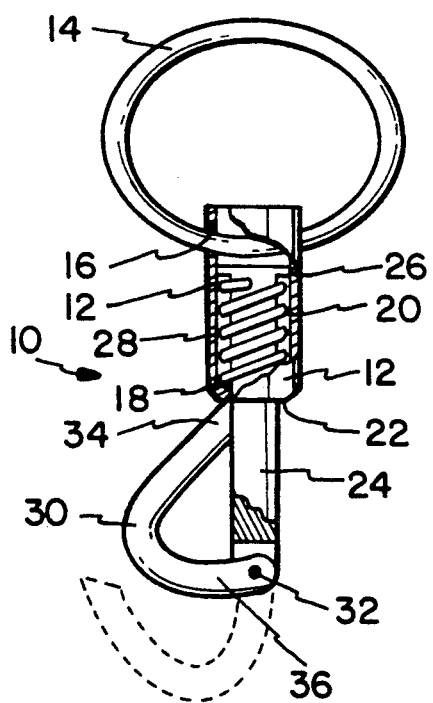
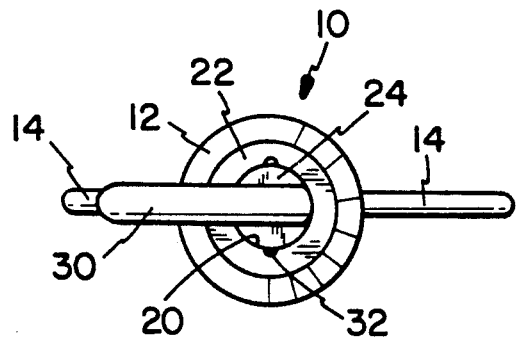

TUG RELEASE CONNECTOR

BACKGROUND OF THE INVENTION

This invention relates to an improved tug release connector and more specifically to a tug release connector which is spring-loaded closed and opens to release an object held by the connector when a user tugs on the object.

There are many conventional connectors and snap hooks which have a hinged clip to hold an object. For instance see U.S. Pat. No. 2,276,628 to Quilter, and U.S. Pat. No. 48,275 to Hamilton. These patents illustrate hinged clips that can be opened to accept an object looped about the clip. When the hinged clip is closed, mechanisms are provided to positively hold the clip in a closed position.

There are times when a clip would be more useful if it could be opened with a tug. The device should be easily closed when an object is looped around the clip and in normal use should hold the object securely. Fisherman, for instance, often clip a landing net to their fisherman's vest to keep their hands free. When the use of a landing net is necessary, a fisherman needs to pull the landing net free quickly with one hand, as his other hand is holding a fishing rod with a hooked fish on the line.

In situations such as the above, it can be seen that a need exists for a connector which is simple to operate and one which releases when a user tugs with sufficient force to open the clip.

SUMMARY OF INVENTION

The present invention relates to a tug release connector which is opened by tugging on an object being held by a clip.

The tug release connector has a hollow body member with a bore therethrough. At one end there is provided a lip surrounding the bore. The beveled lip extends both outward and away from the bore, and also the body member, to act as a catch. An elongate shaft is received by the bore and is spring loaded to partially retract into the hollow body member. The shaft extends from the hollow body member outwardly beyond the lip.

To hold an object, one end of a curved clip is hingedly mounted to the shaft outside the body member. The clip hingedly rotates between a closed position, where a free end of the clip is held by the lip of the body member, and an open position, where the free end is unconstrained from rotating away from the lip. The free end of the hinged clip is sized to be caught by the lip of the hollow body member when the clip rests against the shaft and the shaft is retracted by the spring connected to the shaft. In this position, the clip can hold an object looped over the clip. Whenever a tug on the object extends the shaft, the free end of the clip moves away from the lip to release the object.

BRIEF DESCRIPTION OF THE DRAWINGS

In order that the invention may be clearly understood and readily carried into effect, a preferred embodiment of the invention will now be described, by way of example only, with reference to the accompanying drawings wherein:

FIG. 1 is perspective view of the tug release connector according to the present invention;

FIG. 2 is an elevational view of the connector shown in FIG. 1 with the hollow body member broken away; and FIG. 3 is a bottom view of the connector shown in FIG. 1.

DESCRIPTION OF PREFERRED EMBODIMENT

A preferred embodiment of tug release connector 10 is shown in FIG. 1. Tug release connector 10 has a hollow body member 12 which, adjacent one end, receives a ring 14. Ring 14 extends through holes 16 drilled on opposite sides of hollow body member 12 and is used to hold the tug release connector to some external support.

The hollow body member 12 has bore 20 therethrough. An internally directed flange 18 is provided at one end of member 12. The flange 18 is shaped on its outer surface to provide a concave lip 22.

An elongate shaft 24 is located within bore 20 and is centered within bore 20 by flange 18. Shaft 24 is slidably received by bore 20 and has one end extending from within body member 12 outwardly from the body member beyond lip 22. The other end of shaft 24 includes a disc shaped member 26. A spring 28 is positioned concentrically on shaft 24 between flange 18 and disc 26 to bias shaft 24 toward a retracted position within hollow body member 12. The ring 14 presents the shaft 24 from sliding out of bore 20.

A clip 30 is hingedly connected to an end of shaft 24 adjacent lip 22. Clip 30 is shaped to secure objects looped over the clip when the clip is closed (shown in solid in FIG. 1), and to smoothly release these objects when the clip is opened (shown in phantom in FIG. 2). Clip 30 has an end hingedly connected to an end of shaft 24 by pin 32. The clip 30 is shaped to have a portion 36 which extends transversely to a longitudinal axis of shaft 24 when the clip is closed. Portion 36 intersects the shaft at a position spaced apart from pin 32. A tug on an object positioned adjacent portion 36 is leveraged by portion 36 to rotate clip 30 about hinge 32.

A free end 34 of clip 30 is shaped to be caught between lip 22 and shaft 24 whenever the free end 34 of clip 30 is positioned underneath the lip 22 after manually extending shaft 24 against spring 28. When shaft 24 is released, the free end 34 of clip 30 is held underneath lip 22.

The clip 30, in its closed position, may hold an item looped through clip 30. To release the item, the item is tugged causing shaft 24 to move outwardly against spring 28. As shaft 24 is extended, the free end 34 of clip 30 is released from lip 22 allowing the item held by clip 30 to be released.

In typical use, tug release connector 10 is connected to a fisherman's vest by ring 14. With clip 30 opened, a cord through the handle of a fish landing net is looped around clip 30. Shaft 24 is then extended and the free end 34 of clip 30 inserted underneath lip 22. Shaft 24 is then released whereupon it will be retracted into hollow body member 12 by spring 28. In the retracted position, free end 34 of clip 30 is caught by lip 22. In this position, clip 30 is held against shaft 24 to hold the fish landing net securely within the tug release connector.

When the fisherman desires to use the fish landing net, he grasps the fish landing net and tugs. A tug on the landing net pulls shaft 24 away from the retracted position. The tug also places a leveraging force on the portion 36 of clip 30 adjacent to pin 32. As shaft 24 is extended, the free end 34 slides along lip 22 until a position is reached where free end 34 is free of beveled lip 22. Clip 30 then rotates about pin 32 under the leveraging action of the tug to release the fish landing net.

While the fundamental novel features of the invention have been shown and described, it should be understood that various substitutions, modifications and variations may be made by those skilled in the art without departing from the spirit or scope of the invention. Accordingly, all such modifications or variations are included in the scope of the invention as defined by the following claims.

I claim:

1. A tug release connector for holding an item, comprising:
    an elongated hollow body member having a longitudinal bore therethrough;
    the hollow body member having a concave lip at one end thereof;
    a shaft received by the hollow body member and extending outwardly through and beyond the lip;
    a resilient means located within the bore and connected between the body member and the shaft to bias the shaft to a partially retracted position within the hollow body member;
    a clip having a first and second end, the first end hingedly mounted with a pin to the shaft outside the body member, and the second end sized to be received between the lip and the shaft, whereby when the second end is received between the lip and the shaft, and the resilient means draws the shaft to the retracted position, the clip is closed to hold an item carried by the clip.

2. A tug release connector according to claim 1 wherein the clip is hingedly connected to the shaft at an end thereof, and the clip is shaped to have a portion extending from the pin in an outward direction, transversely to a longitudinal axis of the shaft.

3. A tug release connector according to claim 1 wherein the hollow body member is a hollow cylinder.

4. A tug release connector according to claim 1 wherein the resilient means is a spring.

* * * * *